(12) United States Patent
Adema et al.

(10) Patent No.: US 11,892,649 B2
(45) Date of Patent: Feb. 6, 2024

(54) PASSIVE WORLD-REFERENCED EYE TRACKING FOR SMARTGLASSES

(71) Applicant: Google LLC, Mountain View, CA (US)

(72) Inventors: Daniel Adema, Kitchener (CA); Timothy Paul Bodiya, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/297,372

(22) Filed: Apr. 7, 2023

(65) Prior Publication Data

US 2023/0324703 A1 Oct. 12, 2023

Related U.S. Application Data

(60) Provisional application No. 63/362,646, filed on Apr. 7, 2022.

(51) Int. Cl.
| | | |
|---|---|---|
| *G02B 27/01* | (2006.01) | |
| *F21V 8/00* | (2006.01) | |
| *G09G 3/00* | (2006.01) | |
| *G06F 3/01* | (2006.01) | |

(52) U.S. Cl.
CPC ....... *G02B 27/0179* (2013.01); *G02B 6/0055* (2013.01); *G02B 6/0056* (2013.01); *G02B 27/0172* (2013.01); *G06F 3/013* (2013.01); *G09G 3/002* (2013.01); *G02B 2027/0178* (2013.01); *G02B 2027/0187* (2013.01); *G09G 2354/00* (2013.01)

(58) Field of Classification Search
CPC ............. G02B 27/0179; G02B 6/0055; G02B 6/0056; G02B 27/0172; G02B 2027/0178; G02B 2027/0187; G06F 3/013; G09G 3/002; G09G 2354/00
See application file for complete search history.

(56) References Cited

U.S. PATENT DOCUMENTS

| | | | | |
|---|---|---|---|---|
| 2010/0315720 | A1* | 12/2010 | Filipovich | G02B 27/0172 359/631 |
| 2013/0242392 | A1* | 9/2013 | Amirparviz | G02B 5/3025 359/485.05 |
| 2016/0379606 | A1* | 12/2016 | Kollin | G03H 1/2294 345/428 |
| 2018/0364482 | A1* | 12/2018 | Georgiou | G02B 27/0101 |
| 2021/0349320 | A1* | 11/2021 | Ben Yacov | G02B 5/18 |

* cited by examiner

*Primary Examiner* — Abhishek Sarma
(74) *Attorney, Agent, or Firm* — Brake Hughes Bellermann LLP (57) ABSTRACT

Improved systems ensuring an accuracy of eye gaze measurements in an augmented reality head-mounted wearable device include a radiation direction rerouter (e.g., a partial retroreflector) configured to adjust an angle of incidence of the radiation in the waveguide at a first surface of a waveguide to produce radiation directed at an adjusted angle of incidence at an outcoupler such that the output direction is essentially parallel to the gaze angle of the user's eye. For example, a partial retroreflector may be disposed on a surface of the waveguide opposite the outcoupler provides an additional reflection so that the gaze angle of the user's eye is matched to an angle of an image of the eye pupil onto a world-facing radiation detector (e.g., a camera).

18 Claims, 8 Drawing Sheets

PASSIVE WORLD-REFERENCED EYE TRACKING FOR SMARTGLASSES

CROSS-REFERENCE TO RELATED APPLICATION

This application claims priority to U.S. Patent Application No. 63/362,646, filed on Apr. 7, 2022, entitled "PASSIVE WORLD-REFERENCED EYE TRACKING FOR SMARTGLASSES", the disclosure of which is incorporated by reference herein in its entirety.

TECHNICAL FIELD

This description relates in general to head mounted wearable devices, and in particular, to head mounted wearable computing devices including a display device.

BACKGROUND

Eyewear in the form of glasses may be worn by a user to, for example, provide for vision correction, inhibit sun/glare, provide a measure of safety, and the like. These types of eyewear are typically somewhat flexible and/or deformable, so that the eyewear can be manipulated to comfortably fit the user. An ophthalmic technician can typically manipulate rim portions and/or temple arm portions of a frame of the eyewear, for example, through cold working the frame and/or heating and re-working the frame, to adjust the eyewear for a particular user. In some situations, this re-working of the frame may occur over time, through continued use/wearing of the eyewear by the user. Manipulation in this manner, due to the flexible and/or deformable nature of the material of the frame and/or lenses of the eyewear, may provide a comfortable fit while still maintaining ophthalmic alignment between the eyewear and the user. In a situation in which the eyewear is a head mounted computing device including a display, such as, for example, smart glasses, this type of flexibility/deformation in the frame may cause inconsistent alignment or the display, or misalignment of the display. Inconsistent alignment, or misalignment of the display can cause visual discomfort, particularly in the case of a binocular display. A frame having rigid/non-flexible components, while still providing some level of flexibility in certain portions of the frame, may maintain alignment of the display, and may be effective in housing electronic components of such a head mounted computing device including a display.

SUMMARY

In one general aspect, a head-mounted wearable device includes a frame worn by the user. The frame includes a world-facing radiation detector. The frame also includes an eye-tracking image system configured to produce eye-tracking radiation for measuring a gaze angle of a user's eye, the eye-tracking radiation being reflected from the user's eye. The frame further includes a waveguide, including an incoupler configured to couple the eye-tracking radiation into the waveguide to produce radiation in the waveguide, and an outcoupler configured to couple the radiation in the waveguide out of the waveguide to produce outcoupled radiation, the outcoupled radiation being emitted from the outcoupler in an output direction toward the world-facing radiation detector. The frame further includes a radiation direction rerouter configured to adjust an angle of incidence of the radiation in the waveguide at a first surface of the waveguide to produce radiation directed at an adjusted angle of incidence at the outcoupler such that the output direction is essentially parallel to the gaze angle of the user's eye.

In another general aspect, a method includes disposing, on a waveguide included in a frame of a head-mounted wearable device worn by a user, the frame also including a world-facing radiation detector and an eye-tracking image system configured to produce eye-tracking radiation for measuring a gaze angle of a user's eye, the eye-tracking radiation being reflected from the user's eye, an incoupler configured to couple the eye-tracking radiation into the waveguide to produce radiation in the waveguide. The method also includes disposing, on the waveguide, an outcoupler configured to couple the radiation in the waveguide out of the waveguide to produce outcoupled radiation, the outcoupled radiation being emitted from the outcoupler in an output direction toward the world-facing radiation detector. The method further includes disposing, in the frame, a radiation direction rerouter configured to adjust an angle of incidence of the radiation in the waveguide at a first surface of the waveguide to produce radiation directed at an adjusted angle of incidence at the outcoupler such that the output direction is essentially parallel to the gaze angle of the user's eye.

The details of one or more implementations are set forth in the accompanying drawings and the description below. Other features will be apparent from the description and drawings, and from the claims.

BRIEF DESCRIPTION OF THE DRAWINGS

FIG. 1B is a front view, FIG. 1C is a rear view.

DETAILED DESCRIPTION

This disclosure relates to mechanisms for eyewear in augmented or mixed reality (AR/MR) that ensure accuracy of a gaze position of a user's eyes. For example, ophthalmic glasses frames should have some compliance or flexibility for the comfort of the wearer. Such glasses are typically somewhat flexible and/or deformable so that the glasses can be manipulated to adapt to a particular head size and/or shape, a particular arrangement of features, a preferred pose of the glasses on the face, and the like, associated with a user to provide a comfortable fit for the user. Along these lines, a frame of the eyewear can be deformed by, for example, heating and/or re-forming plastic frames, or bending and/or flexing frames made of other materials. Thus, flexible or deformable characteristics of the material of the frame of the eyewear may allow the eyewear to be customized to fit a particular user, while still maintaining the functionality of the eyewear.

A technical problem with allowing such flexibility in the frame is that such flexibility may cause uncertainty in the gaze position of a user's eye. For example, accuracy of gaze position may depend on a fixed relationship between directions of a light propagation vectors at a respective ingress and egress of the waveguide, i.e., input and output light propagation vectors. Specifically, when eye-tracking images and world-facing camera images are aligned, the input and output light propagation vectors have reciprocal directions, meaning that they have equal angles with respect to the respective surface normals to the waveguide WG by the same angle, in opposite directions. Nevertheless, in a situation in which the eyewear is in the form of smart glasses including display capability, computing/processing capability, and the like, a flexible or deformable frame may cause a movement of a waveguide in the smart glasses frame. Such a movement of the waveguide may affect the direction of the output light propagation vector, which in turn may result in the pupil position to be variable.

Keeping the frame of the eyewear rigid to avoid any flexibility could cause the displays to move and misalign the camera and eye-tracking images. This, however, may add undesirable weight to the eyewear and cause the user to experience discomfort wearing the eyewear.

A control system for the cameras and other sensors mounted on the frame of the eyewear could be used to dynamically adjust the displays for variance of the positions of the displays. Such control systems, however, may add significant cost and complexity to the augmented reality system. The complexity, along with increasing the cost of the system, may also cause a processing lag because of the complexity of the controls needed to adjust the eye-tracking images in real time.

A technical solution ensuring an accuracy of eye gaze measurements in an augmented reality head-mounted wearable device include a radiation direction rerouter (e.g., a partial retroreflector) configured to adjust an angle of incidence of the radiation in the waveguide at a first surface of a waveguide to produce radiation directed at an adjusted angle of incidence at an outcoupler such that the output direction is essentially parallel (e.g., to within 0.5 degrees) to the gaze angle of the user's eye. For example, a partial retroreflector may be disposed on a surface of the waveguide opposite the outcoupler to provide an additional reflection so that the gaze angle of the user's eye is essentially parallel (e.g., to within 0.5 degrees) to an angle of an image of the eye pupil onto a world-facing radiation detector (e.g., a camera).

A technical advantage of the above-described technical solution is that an accurate gaze position of a user's eye is obtained without requiring rigidity in the frame, thus enabling a degree of comfort for the user. Another technical advantage of the above-described technical solution is that complex control systems that may be costly and burdensome are avoided.

Figure 1A:
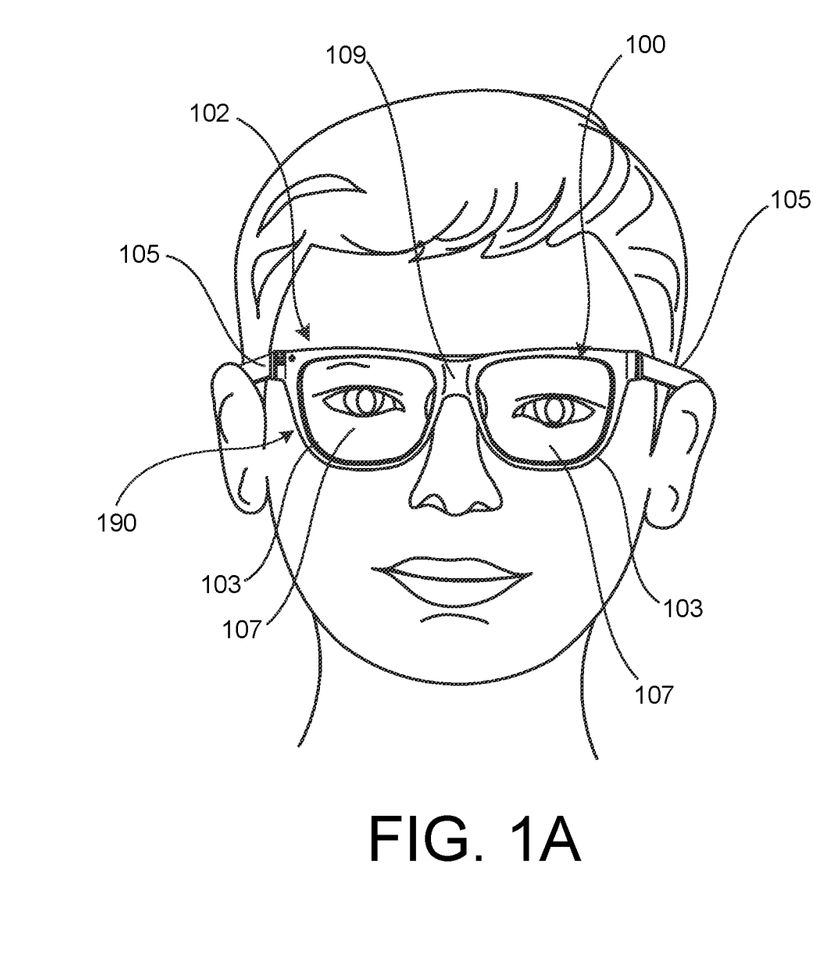
FIG. 1A illustrates an example system, in accordance with implementations described herein.
Figure 1B:
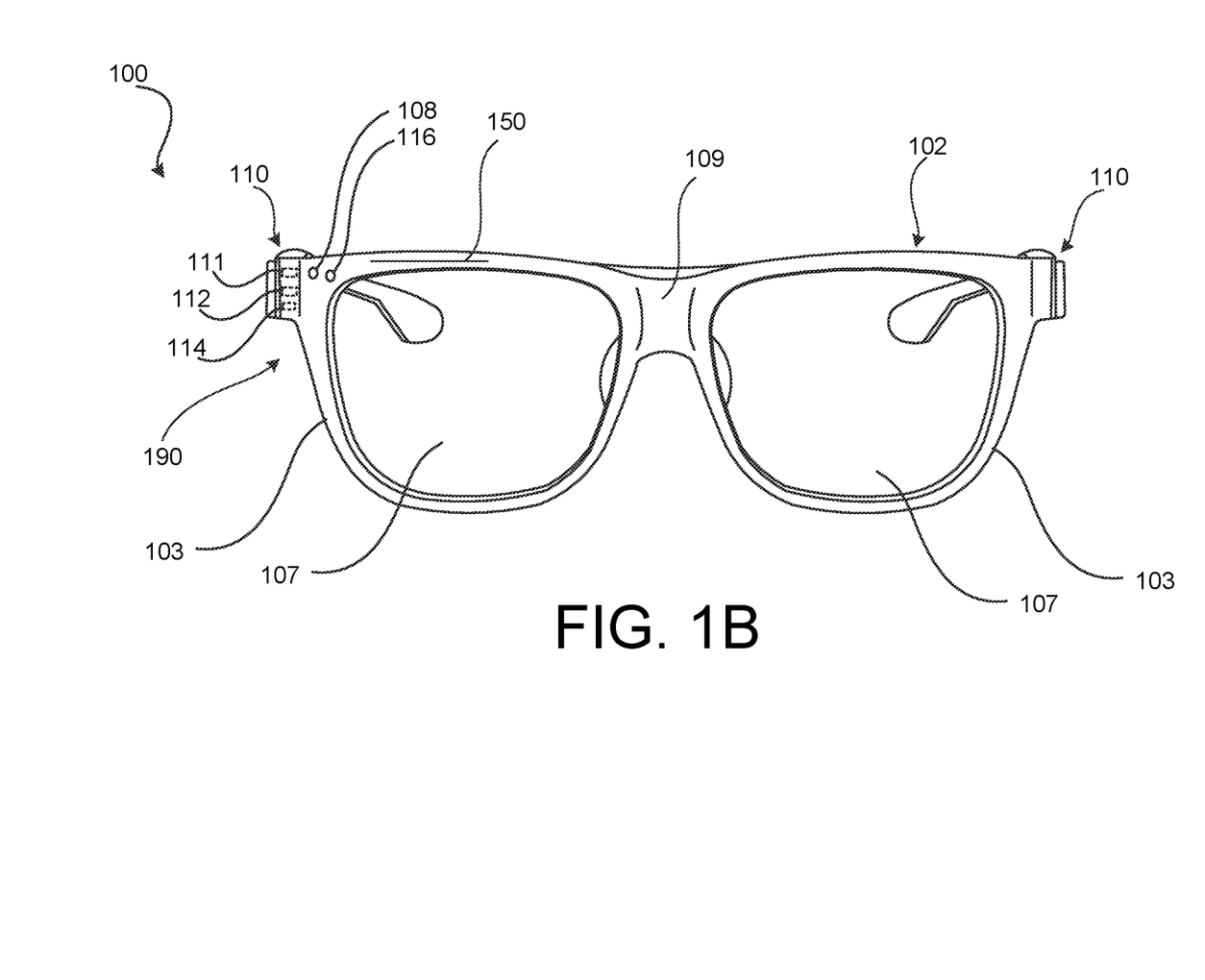
Figure 1C:
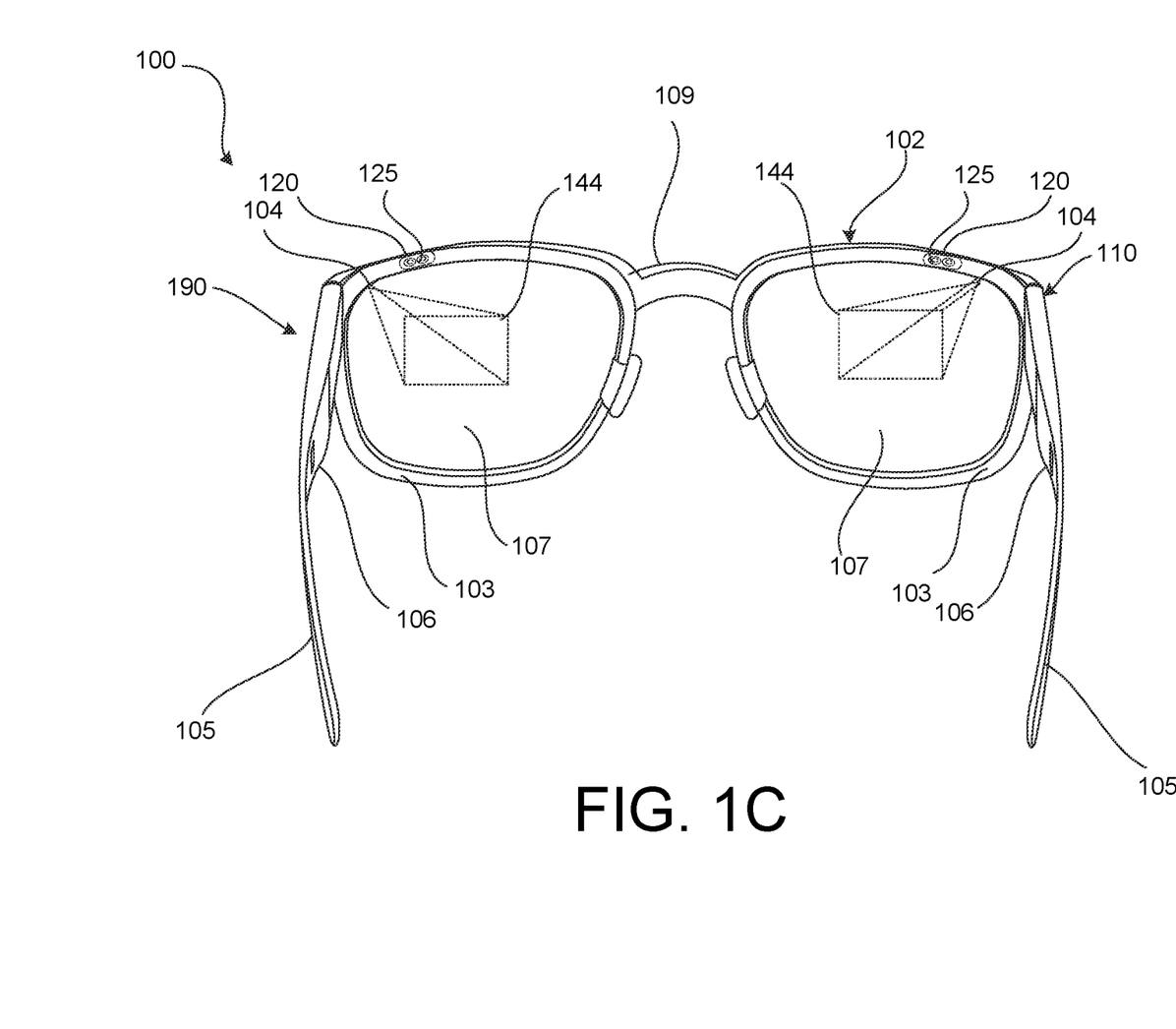
Figure 1D:
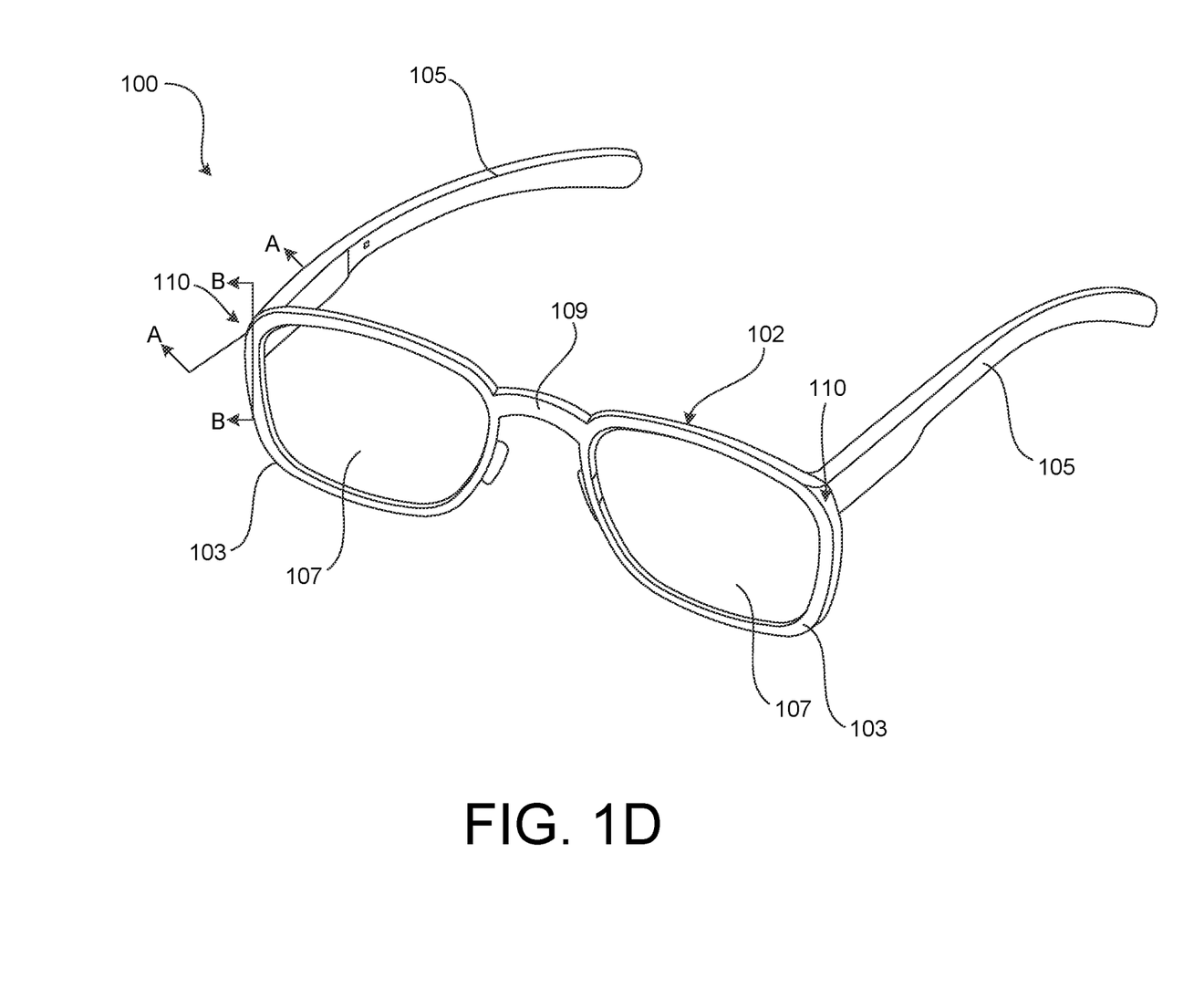
FIG. 1D is a perspective view, of an example head mounted wearable device shown in FIG. 1A, in accordance with implementations described herein.

FIG. 1A illustrates a user wearing an example head mounted wearable device 100. In this example, the example head mounted wearable device 100 is in the form of example smartglasses including display capability and computing/processing capability, for purposes of discussion and illustration. The principles to be described herein may be applied to other types of eyewear, both with and without display capability and/or computing/processing capability. FIG. 1B is a front view, FIG. 1C is a rear view, and FIG. 1D is a perspective view, of the example head mounted wearable device 100 shown in FIG. 1A. As noted above, in some examples, the example head mounted wearable device 100 may take the form of a pair of smart glasses, or augmented reality glasses. The head mounted wearable device 100 shown in FIGS. 1A through 1D includes a radiation direction rerouter configured to adjust an angle of incidence of the radiation in a waveguide 150 at a first surface of the waveguide 150 to produce radiation directed at an adjusted angle of incidence at the outcoupler such that the output direction is essentially parallel (e.g., to within 0.5 degrees) to the gaze angle of the user's eye. Such a radiation direction rerouter enables the gaze angle of the user's eye to be tracked accurately even when the smartglasses are flexed.

As shown in FIGS. 1B-1D, the example head mounted wearable device 100 includes a frame 190. The frame 190 includes a front frame portion 102. The front frame portion 102 is defined by rim portions 103 surrounding respective optical portions in the form of lenses 107, with a bridge portion 109 connecting the rim portions 109. Arm portions 105 are coupled, for example, pivotably or rotatably coupled, to the front frame portion 102 by hinge portions 110 at the respective rim portion 103. In some examples, the lenses 107 may be corrective/prescription lenses. In some examples, the lenses 107 may be an optical material including glass and/or plastic portions that do not necessarily incorporate corrective/prescription parameters.

In some examples, a display device 104 may be coupled in a portion of the frame 190 to output content for viewing by the user at one or both of the lense(s) 107. An eye box may extend toward one or both of the lens(es) 107, for output of content at an output coupler 144 at which content output by the display device 104 may be visible to the user. In some examples, the output coupler 144 may be substantially coincident with the lens(es) 107. In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics 150 may be used to depict content on the display device 104.

In some examples, the head mounted wearable device 100 may include at least one gaze tracking device 120. The at least one gaze tracking device 120 may include one or more sensors 125, to detect and track eye gaze direction and movement. Data captured by the sensor(s) 125 may be processed to detect and track gaze direction and movement as a user input. In some examples, multiple gaze tracking devices 120 may track gaze direction and movement of both eyes of the user.

In some examples, the head mounted wearable device 100 can also include an audio output device 106 (such as, for example, one or more speakers), an illumination device 108, a sensing system 111, a control system 112, at least one processor 114, and an outward facing image sensor 116, or camera 116. In some examples, the sensing system 111 may include various sensing devices and the control system 112 may include various control system devices including, for example, one or more processors 114 operably coupled to the components of the control system 112. In some examples, the control system 112 may include a communication module providing for communication and exchange of information between the wearable computing device 100 and other external devices.

The waveguide 150 may be used to ensure accuracy of the detected eye gaze direction. For example, a radiation direction rerouter may be disposed in the frame 102, e.g., on a surface of the waveguide 150, to ensure that an output direction of light from an outcoupler of the waveguide 150 that is input into the gaze tracking device 120 is essentially parallel to the gaze angle of the user's eye. In some implementations, the radiation direction rerouter takes the form of a partial retroreflector disposed on a surface on the waveguide 150 opposite that of the outcoupler. In this way, external light from world space may pass through the partial retroreflector, while light incident on the partial retroreflector from the outcoupler is reflected back toward the eye tracking device 120.

Figure 2A:
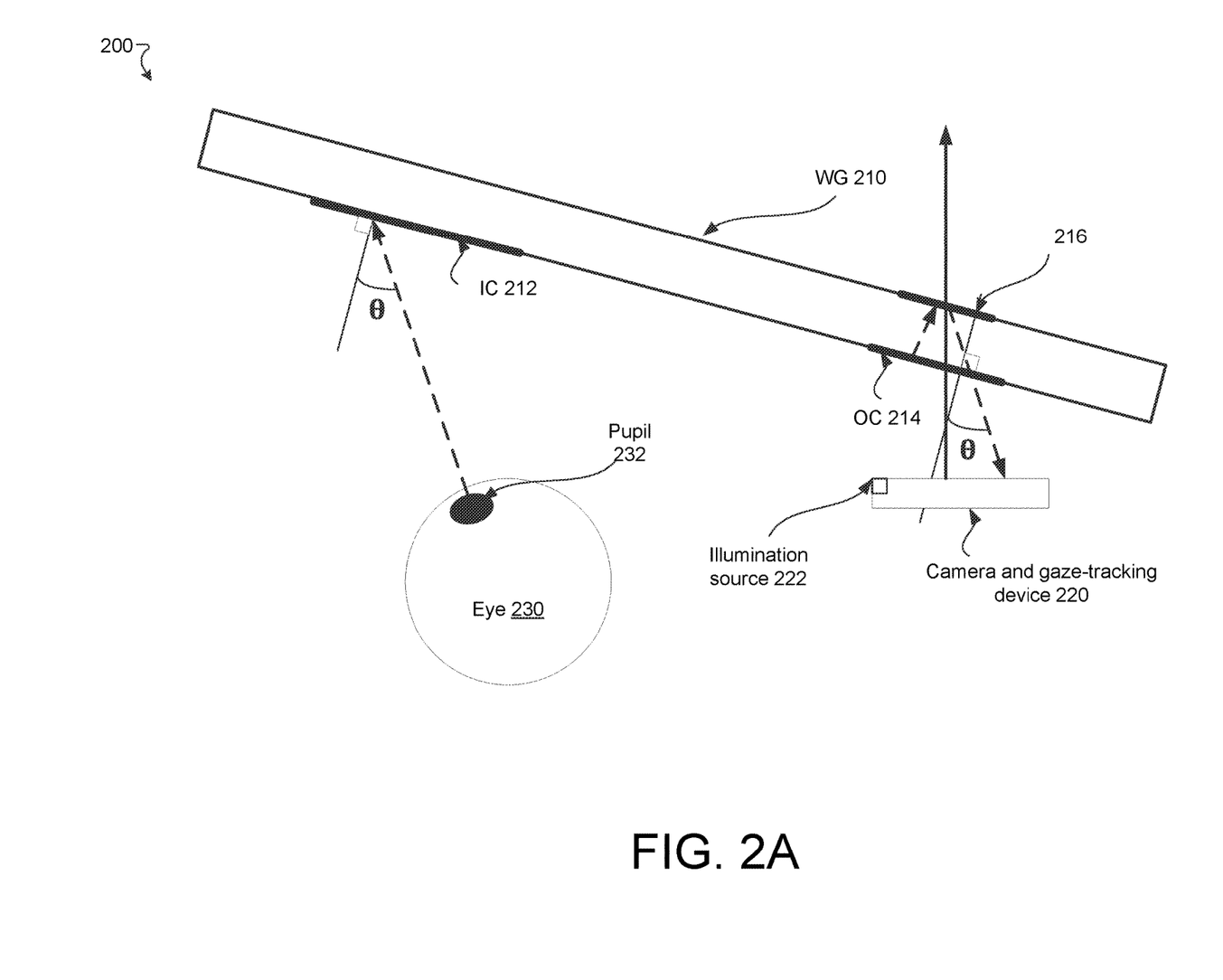
FIGS. 2A and 2B illustrate an example system using a radiation direction rerouter, in accordance with implementations described herein.
Figure 2B:
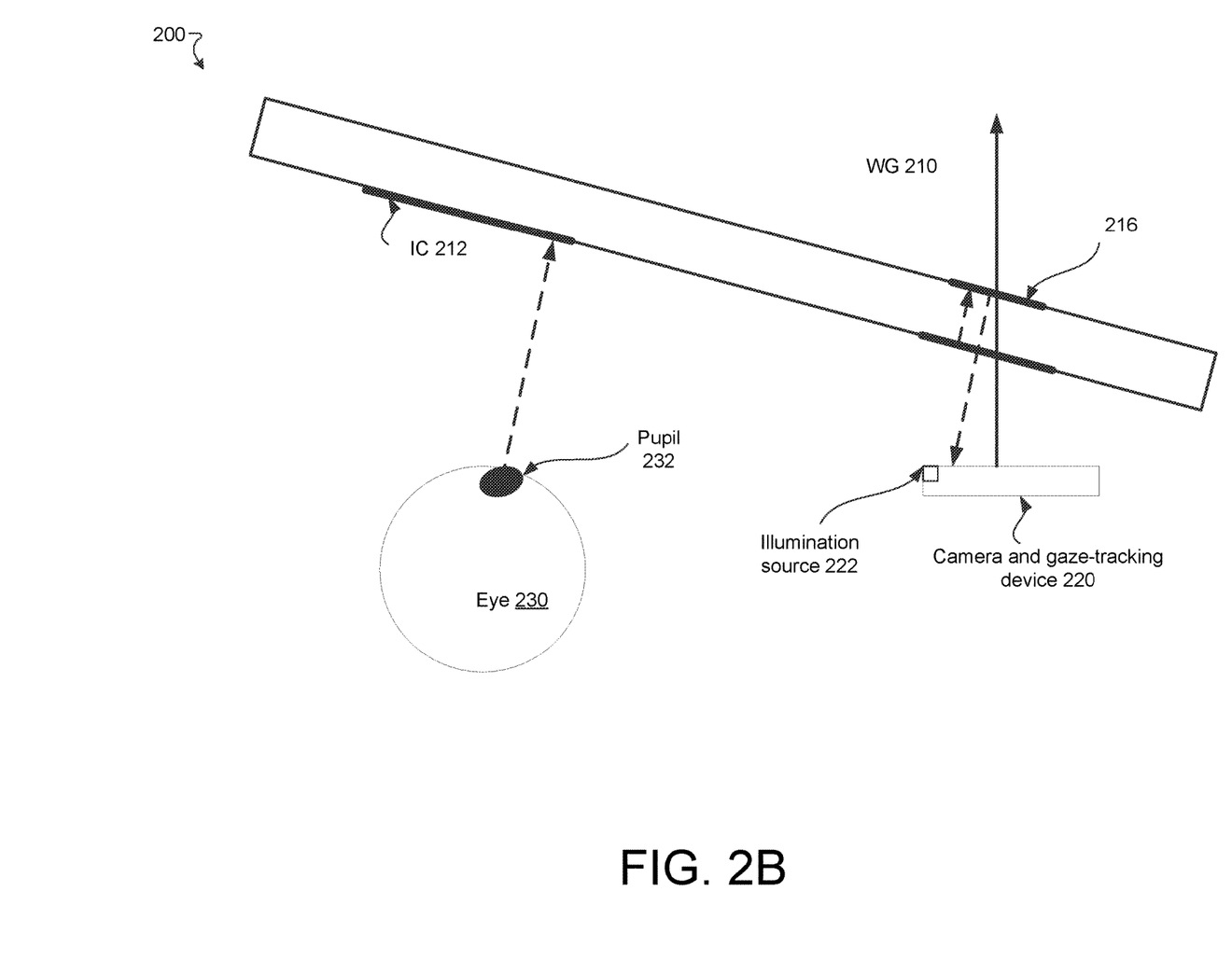

FIGS. 2A and 2B illustrate an example system 200 using a radiation direction rerouter 316, in accordance with implementations described herein. FIG. 2A shows a gaze angle being at an angle θ with respect to a normal to the surface of the waveguide. FIG. 2B shows the gaze angle being normal with respect to the normal to the surface of the waveguide.

As shown in FIGS. 2A and 2B, the system 200 includes a waveguide WG 210 with an incoupler IC 212 on a surface of the WG 210 and an outcoupler OC 214 on the same surface. In some implementations, the IC 212 and OC 214 include a diffraction grating. In some implementations, the diffraction grating is a blazed diffraction grating. In some implementations, the diffraction grating is a volume holographic grating.

The system 200 as shown in FIGS. 2A and 2B further includes a camera and gaze-tracking device 220. As shown in FIGS. 2A and 2B, the world-facing camera and the eye-tracking device are combined onto a single camera and gaze-tracking device 220.

The camera and gaze-tracking device 220 is configured to capture images of real objects. As shown in FIG. 2A, the camera and gaze-tracking device 220 is positioned at an angle with respect to the WG 210 and, accordingly, the OC 212.

The camera and gaze-tracking device 220 also has an illumination source 222 configured to reflect gaze-tracking radiation from the user's eye. The gaze-tracking radiation, upon reflection, carries information about the position of the pupil of the user's eye, and hence gaze angle. In some implementations, the gaze-tracking radiation includes electromagnetic radiation having a wavelength in a spectral range that includes the infrared band and is centered on an infrared wavelength. In some implementations, the gaze-tracking radiation is emitted according to a specified temporal schedule (i.e., chirped pattern). In some implementations, the gaze-tracking radiation is emitted according to a specified spatial pattern, e.g., apodized.

The system 200 further includes a radiation direction rerouter 216 configured to adjust an angle of incidence of the radiation in the waveguide on a surface of the waveguide opposite the OC 214. In some implementations and as shown in FIGS. 2A and 2B, the radiation direction rerouter 216 includes a partial retroreflector. As shown in FIGS. 2A and 2B, the partial retroreflector allows external radiation to pass through to the camera and gaze-tracking device 220. The camera and gaze-tracking device 220 is oriented such that the orientation of the camera and gaze-tracking device 220 is parallel to the gaze angle of the user's eye.

In some implementations, the radiation direction rerouter 216 includes a partial mirror. In some implementations, the partial mirror is about 10% reflective and about 90% transmissive. Other reflectivities and transmissivities may be used. In some implementations, the radiation direction rerouter 216 includes a polarizing beam splitter that is configured to transmit radiation having a first polarization and reflect radiation having a second polarization. In some implementations, the beam splitter takes the form of a thin-film beamsplitter, a polka dot beamsplitter, a pellicle, or the like.

In some implementations, the system 200 includes a projection system (not shown) configured to project internally generated radiation for producing virtual images to be combined with real images via the WG 210. In some implementations, the projection system is aligned to an orientation of the camera and gaze-tracking device 220 during an initial calibration operation that is performed prior to operation of the head-mounted wearable device.

More generally, the system 200 may be designed such that the camera and gaze-tracking device 220 and the projection system are rigidly coupled, i.e., the respective chief rays of the camera and the projection system have a fixed relationship. In some implementations, the chief rays are essentially parallel (e.g., to within 0.5 degrees). In some implementations, the chief rays differ by a specified angle.

It is noted that the system does not require a precise or stable angular alignment of the WG 210 to the camera and gaze-tracking device 220. For any angle of the WG 210, the angle of light of the pupil to the camera and gaze-tracking device 220 is parallel to the gaze angle of the eye. Accordingly, there does not need to be a rigid relationship between the camera and gaze-tracking device 220 and the WG 210. This is significantly different than conventional headsets where the rigidity requirement is necessary for the entire headset. This enables smaller, lighter, and flexible (more comfortable) smart glasses. In the case of separate cameras for world-facing and eye tracking, the only rigidity requirement is in the alignment between the separate cameras, and not between the cameras and the WG 210.

It is also noted that the alignment between the camera and gaze-tracking device 220 and the gaze angle eliminates the need for real-time alignment monitoring feedback loops between the real objects and virtual objects. As mentioned above, in some implementations there is an initial calibration to set the alignment between the projector and camera and gaze-tracking device 220, but this calibration will only need to be done at initial setup, and not during device use.

Figure 3:
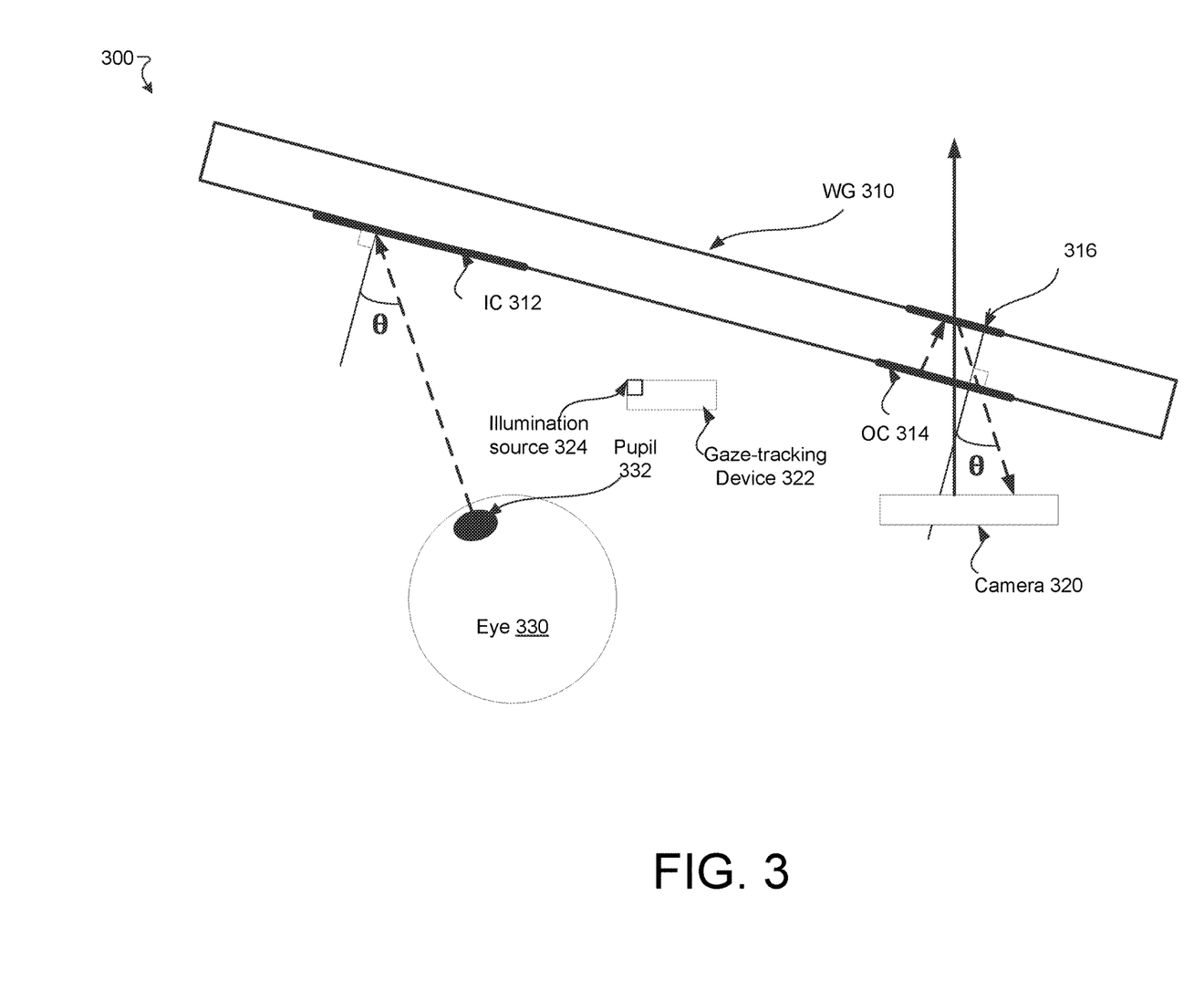
FIG. 3 illustrates an example system using a radiation direction rerouter, in accordance with implementations described herein.

FIG. 3 illustrates an example system 300 using a radiation direction rerouter 316, in accordance with implementations described herein. FIG. 3 shows a gaze angle being at an angle θ with respect to a normal to the surface of the waveguide.

As shown in FIG. 3, the system 300 includes a waveguide WG 310 with an incoupler IC 312 on a surface of the WG 310 and an outcoupler OC 314 on the same surface. In some implementations, the IC 312 and OC 314 include a diffraction grating. In some implementations, the diffraction grating is a blazed diffraction grating. In some implementations, the diffraction grating is a volume holographic grating.

The system 300 as shown in FIG. 3 further includes a camera (world-facing radiation detector) 320 and a separate gaze-tracking device 322. The camera is configured to capture images of real objects. As shown in FIG. 3, the camera 320 is positioned at an angle with respect to the WG 310 and, accordingly, the OC 312.

The gaze-tracking device 322 has an illumination source 324 configured to reflect gaze-tracking radiation from the user's eye. The gaze-tracking radiation, upon reflection, carries information about the position of the pupil of the user's eye, and hence gaze angle. In some implementations, the gaze-tracking radiation includes electromagnetic radiation having a wavelength in a spectral range that includes the infrared band and is centered on an infrared wavelength. In some implementations, the gaze-tracking radiation is emitted according to a specified temporal schedule (i.e., chirped pattern). In some implementations, the gaze-tracking radiation is emitted according to a specified spatial pattern, e.g., apodized.

The system 300 further includes a radiation direction rerouter 316 configured to adjust an angle of incidence of the radiation in the waveguide; the radiation direction rerouter 316 is located on a surface of the waveguide opposite the OC 314. In some implementations and as shown in FIG. 3, the radiation direction rerouter 316 includes a partial retroreflector. As shown in FIG. 3, the partial retroreflector allows external radiation to pass through to the camera and gaze-tracking device 220. The camera and gaze-tracking device 320 is oriented such that the orientation of the camera and gaze-tracking device 320 is parallel to the gaze angle of the user's eye.

In some implementations, the radiation direction rerouter 316 includes a partial mirror. In some implementations, the partial mirror is about 10% reflective and about 90% transmissive. Other reflectivities and transmissivities may be used. In some implementations, the radiation direction rerouter 316 includes a polarizing beam splitter that is configured to transmit radiation having a first polarization and reflect radiation having a second polarization. In some implementations, the beam splitter takes the form of a thin-film beamsplitter, a polka dot beamsplitter, a pellicle, or the like.

In some implementations, the system 300 includes a projection system (not shown) configured to project internally generated radiation for producing virtual images to be combined with real images via the WG 310. In some implementations, the projection system is aligned to an orientation of the camera and gaze-tracking device 320 during an initial calibration operation that is performed prior to operation of the head-mounted wearable device.

More generally, the system 300 may be designed such that the camera 320 and the projection system are rigidly coupled, i.e., the respective chief rays of the camera and the projection system have a fixed relationship. In some implementations, the chief rays are parallel. In some implementations, the chief rays differ by a specified angle.

It is noted that the system does not require a precise or stable angular alignment of the WG 310 to the camera 320. For any angle of the WG 210, the angle of light of the pupil to the camera 320 is parallel to the gaze angle of the eye. Accordingly, there does not need to be a rigid relationship between the camera 320 and the WG 210. This is significantly different than conventional headsets where the rigidity requirement is necessary for the entire headset. This enables smaller, lighter, and flexible (more comfortable) smart glasses. In this case where the camera 320 and the gaze-tracking device 322 are separate, the only rigidity requirement is in the alignment between the camera 320 and the gaze-tracking device 322, and not between the camera 320, the gaze-tracking device 322, and the WG 310.

It is also noted that the alignment between the camera 320 and the gaze angle eliminates the need for real-time alignment monitoring feedback loops between the real objects and virtual objects. As mentioned above, in some implementations there is an initial calibration to set the alignment between the projector and camera 320, but this calibration will only need to be done at initial setup, and not during device use.

Figure 4:
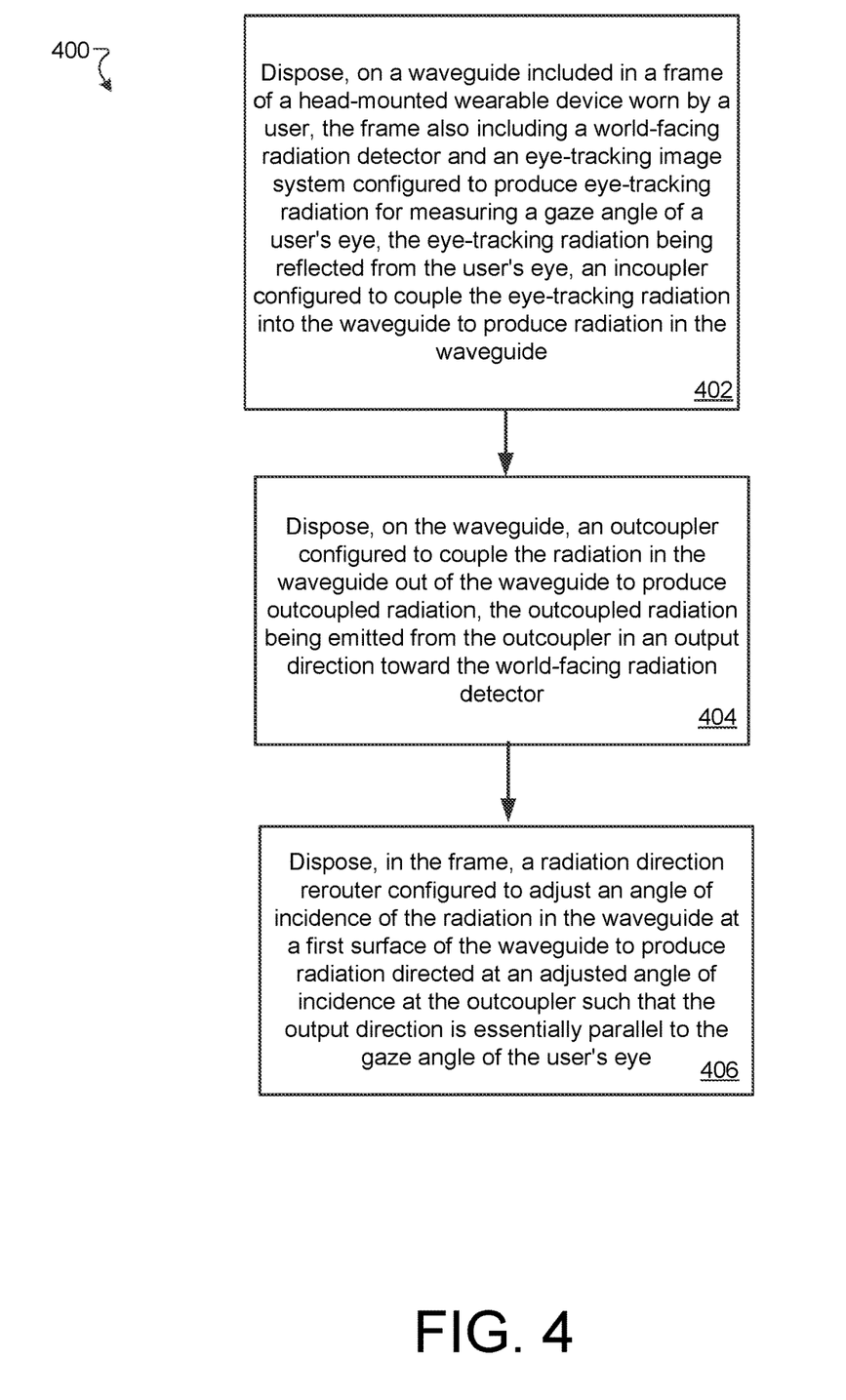
FIG. 4 is a flow chart illustrating a method of obtaining a gaze position of a user's eye.

FIG. 4 is a flow chart illustrating a method 400 of obtaining a gaze position of a user's eye.

At 402, an incoupler is disposed on a waveguide included in a frame of a head-mounted wearable device worn by a user, the frame also including a world-facing radiation detector and an gaze-tracking device configured to produce gaze-tracking radiation for measuring a gaze angle of a user's eye, the gaze-tracking radiation being reflected from the user's eye, the incoupler being configured to couple the gaze-tracking radiation into the waveguide to produce radiation in the waveguide.

At 404, an outcoupler is disposed on the waveguide, the outcoupler being configured to couple the radiation in the waveguide out of the waveguide to produce outcoupled radiation, the outcoupled radiation being emitted from the outcoupler in an output direction toward the world-facing radiation detector.

At 406, a radiation direction rerouter is disposed in the frame, a radiation direction rerouter configured to adjust an angle of incidence of the radiation in the waveguide at a first surface of the waveguide to produce radiation directed at an adjusted angle of incidence at the outcoupler such that the output direction is essentially parallel to the gaze angle of the user's eye.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A head-mounted wearable device, including:
    a frame worn by a user, including:
        a world-facing radiation detector;
        a gaze-tracking device configured to produce gaze-tracking radiation for measuring a gaze angle of a user's eye, the gaze-tracking radiation being reflected from the user's eye;
        a waveguide including:
            an incoupler configured to couple the gaze-tracking radiation into the waveguide to produce radiation in the waveguide; and
            an outcoupler configured to couple the radiation in the waveguide out of the waveguide to produce outcoupled radiation, the outcoupled radiation being emitted from the outcoupler in an output direction toward the world-facing radiation detector; and
        a radiation direction rerouter configured to adjust an angle of incidence of the radiation in the waveguide at a first surface of the waveguide to produce radiation directed at an adjusted angle of incidence at the outcoupler such that the output direction is essentially parallel to the gaze angle of the user's eye.

2. The head-mounted wearable device as in claim 1, wherein the outcoupler is located on a second surface of the waveguide, the second surface being opposite the first surface.

3. The head-mounted wearable device as in claim 2, wherein the radiation direction rerouter includes a partial retroreflector mirror.

4. The head-mounted wearable device as in claim 2, wherein the radiation direction rerouter includes a polarizer configured to change a polarization of the radiation in the waveguide.

5. The head-mounted wearable device as in claim 1, further comprising:
    a projection system configured to emit internally generated radiation, the projection system being aligned to an orientation of the world-facing radiation detector during an initial calibration operation that is performed prior to operation of the head-mounted wearable device.

6. The head-mounted wearable device as in claim 1, wherein the gaze-tracking radiation has a wavelength in a spectral range that includes an infrared band.

7. The head-mounted wearable device as in claim 1, wherein the gaze-tracking radiation is emitted according to a specified temporal schedule.

8. The head-mounted wearable device as in claim 1, wherein the gaze-tracking radiation is emitted according to a specified spatial pattern.

9. The head-mounted wearable device as in claim 1, wherein the gaze-tracking device is separate from the world-facing radiation detector.

10. A method, comprising:
    disposing, on a waveguide included in a frame of a head-mounted wearable device worn by a user, the frame also including a world-facing radiation detector and an gaze-tracking device configured to produce gaze-tracking radiation for measuring a gaze angle of a user's eye, the gaze-tracking radiation being reflected from the user's eye, an incoupler configured to couple the gaze-tracking radiation into the waveguide to produce radiation in the waveguide;
    disposing, on the waveguide, an outcoupler configured to couple the radiation in the waveguide out of the waveguide to produce outcoupled radiation, the outcoupled radiation being emitted from the outcoupler in an output direction toward the world-facing radiation detector; and
    disposing, in the frame, a radiation direction rerouter configured to adjust an angle of incidence of the radiation in the waveguide at a first surface of the waveguide to produce radiation directed at an adjusted angle of incidence at the outcoupler such that the output direction is essentially parallel to the gaze angle of the user's eye.

11. The method as in claim 10, wherein the outcoupler is located on a second surface of the waveguide, the second surface being opposite the first surface.

12. The method as in claim 11, wherein the radiation direction rerouter includes a partial retroreflector mirror.

13. The method as in claim 11, wherein the radiation direction rerouter includes a polarizer configured to change a polarization of the radiation in the waveguide.

14. The method as in claim 10, wherein the head-mounted wearable device further includes a projection system configured to emit internally generated radiation, the projection system being aligned to an orientation of the world-facing radiation detector during an initial calibration operation that is performed prior to operation of the head-mounted wearable device.

15. The method as in claim 10, wherein the gaze-tracking radiation has a wavelength in a spectral range that includes an infrared band.

16. The method as in claim 10, wherein the gaze-tracking radiation is emitted according to a specified temporal schedule.

17. The method as in claim 10, wherein the gaze-tracking radiation is emitted according to a specified spatial pattern.

18. The method as in claim 10, wherein the gaze-tracking device is separate from the world-facing radiation detector.

* * * * *